United States Patent [19]

Reinherz

[11] Patent Number: 4,892,847

[45] Date of Patent: Jan. 9, 1990

[54] LEAD-FREE GLASS FRIT COMPOSITIONS

[75] Inventor: Barry P. Reinherz, Lawrence, Pa.

[73] Assignee: Ciba-Geigy Corporation, Ardsley, N.Y.

[21] Appl. No.: 206,250

[22] Filed: Jun. 13, 1988

[51] Int. Cl.$^4$ .......................... C03C 8/02; C03C 3/064
[52] U.S. Cl. ......................................... 501/14; 501/21; 501/77
[58] Field of Search .............................. 501/14, 21, 77

[56] References Cited

U.S. PATENT DOCUMENTS

| | | | |
|---|---|---|---|
| 4,084,976 | 4/1978 | Hinton | 501/26 |
| 4,224,074 | 9/1980 | Reade | 501/21 |
| 4,312,951 | 1/1982 | Eppler | 501/24 |
| 4,340,645 | 7/1982 | O'Connor | 501/17 |
| 4,361,654 | 11/1982 | Ohmura et al. | 501/21 |
| 4,376,169 | 3/1983 | Eppler | 501/24 |
| 4,446,241 | 5/1984 | Francel et al. | 501/14 |
| 4,537,862 | 8/1985 | Francel et al. | 501/14 |
| 4,554,258 | 11/1985 | Francel | 501/21 |
| 4,590,171 | 5/1986 | Nigrin | 501/21 |

*Primary Examiner*—William R. Dixon, Jr.
*Assistant Examiner*—Anthony J. Green
*Attorney, Agent, or Firm*—Harry Falber

[57] ABSTRACT

Lead-free glass frit compositions for use in vitreous coatings consisting essentially of $SiO_2$-$Bi_2O_3$-$B_2O_3$-alkali metal oxide-$ZrO_2$/$TiO_2$ in appropriate concentrations.

6 Claims, No Drawings

LEAD-FREE GLASS FRIT COMPOSITIONS

Durable inorganic compositions used in the coating or decorating of glass, glass ceramics, ceramic and porcelain articles generally fall into three categories; glazes, porcelain enamels, and glass enamels. Such coatings or decorations are usually applied to an article at ambient temperature conditions and then heated to fuse the respective coating or decoration to the article being treated. The treated article is then cooled to ambient or service conditions and the coating or decoration will generally be firmly bonded to the treated article. Typically such coatings are non-porous and are impervious to various chemicals and solutions which might destroy the utility of an uncoated article or an article with a relatively non-durable coating or decoration.

Glazes are generally meant to be applied to ceramic articles as a uniform vitreous or devitrified coating, or selectively for decorative purposes. Glazes can be a transparent glassy coating, or can be colored by the inclusion of pigments in the glaze. Glazes are applied by various methods such as dipping, spraying, screen printing or other techniques.

Depending on the method of application of a glaze to a ceramic article, a vehicle or medium may be used to permit the application of the glaze. The vehicle or medium volatilizes during the fusing process leaving only the frit and pigments. The ingredients of such a glaze typically are: a glassy finely divided powder called a frit (or frits); a pigment (or pigments) which will withstand the temperatures needed to fuse the frit coating and which is included as a colorant or opacifier; and a vehicle such as water, with or without additives, an organic fluid, a thermoplastic, or other mediums. The finely divided powdered ingredients (frits and pigments) are generally dispersed or suspended in the vehicle or medium forming a slurry or a paste. The slurry can be sprayed or used for dipping for example, and the paste can be screen printed or applied by numerous other methods.

Porcelain enamels and glass enamels differ from glazes in several respects such as the types of articles to which they are applied, certain of the methods of applications and the temperature ranges which are used to fuse such coatings or decorations. Porcelain enamels and glass enamels similarly consist of a frit or frits, along with a pigment or opacifier if desired, and usually a vehicle system for application purposes.

Glazes, glass enamels and porcelain enamels are often compounded with lead and/or cadmium in the frit formulation, so as to provide several important characteristics desired by the user. Cadmium sulfides or cadmium sulfo-selenides are often used as pigments in such coatings or decorations. In order to provide a red or yellow colored coating or decoration, it is often helpful to compound the frit with cadmium to enhance the pigmentation of such cadmium sulfides or sulfo-selenides. Among the properties frequently enhanced by the use of lead and cadmium are lowered fusing temperature requirements and improved adhesion and resistance to chemical attack. It is especially important to have as low a fusing temperature as possible when applying a coating or decoration to an article, so as to prevent thermal deformation of the article. Glass articles most often are sensitive to this problem, due to the generally lower thermal deformation temperature range of glass compared to ceramics or cast iron. Although lead and cadmium have important uses in the formulation of glaze frits, porcelain enamel frits, and glass enamel frits, adverse toxicological effects from lead and cadmium have resulted in various prohibitions and restrictions in their use in such formulas. It has, therefore, been necessary to formulate glass frit products having equivalent or improved performance characteristics, but with no lead or cadmium components.

A number of such lead-free products have been disclosed. By way of illustration, U.S. Pat. No. 4,554,258 discloses frits which require the presence of $Bi_2O_3$, $B_2O_3$, $SiO_2$ and alkali metal oxides where the bismuth oxide is necessarily present in large concentrations; U.S. Pat. No. 4,376,169 discloses frits which require the presence of alkali oxide, $B_2O_3$, $Al_2O_3$, $SiO_2$, F, $P_2O_5$, ZnO and $TiO_2$ and which have critical compositional limits; U.S. Pat. No. 4,446,241 discloses frits which require the presence of $Li_2O$, $B_2O_3$ and $SiO_2$ among other oxides; U.S. Pat. No. 4,537,862 discloses frits which require the presence of $B_2O_3$, $SiO_2$, $ZrO_2$ and rare earth oxides with the weight ratio of $ZrO_2$ to rare earth oxides being critical; and U.S. Pat. No. 4,590,171 discloses frits which require the presence of $Li_2O$, $Na_2O$, BaO, $Ba_2O_3$, $Al_2O_3$, $SiO_2$, $ZrO_2$ and F. Reference is also made to U.S. Pat. No. 4,084,976, U.S. Pat. No. 4,224,074, U.S. Pat. No. 4,312,951, U.S. Pat. No. 4,340,645 and U.S. Pat. No. 4,361,654 as additional patents in this general area. It is thus seen that the formulations have varied the nature and concentration of the oxide components in an attempt to provide acceptable frit formulations. While such frits are alleged to exhibit a variety of desirable properties, they still exhibit deficiencies in one or more performance areas.

Accordingly, it is the primary object of this invention to provide lead-free glass frit compositions which exhibit a broad range of improved performance characteristics.

It is a further object to provide such frits which are low melting and are resistant to acid attack and exposure to detergent solutions, and which have thermal expansion coefficients which permit the application of these frits to a wide variety of commercial glass, glass ceramic, porcelain and ceramic articles without creating harmful stresses.

Various other objects and advantages of this invention will become apparent from the following descriptive material.

It has now been surprisingly determined that the aforementioned objectives are met by preparing lead-free glass frits which consist of $SiO_2$, $Bi_2O_3$, $B_2O_3$, alkali metal oxides and $ZrO_2$ and/or $TiO_2$ in appropriate concentration ranges. Such systems meet the primary requirement of being operative in vitreous coatings without the presence of lead and cadmium components. In addition, these formulations exhibit a broad range of desirable properties including low melting points, sufficiently low thermal expansion to avoid crazing when applied over various substrates and low water solubility to facilitate their use in water based spray mediums. Of particular significance is the excellent resistance to acid attack, such as that encountered from various acid-containing liquids including juice, as well as the resistance to detergent exposure. As a result, these glass frit compositions are available for a broad range of glazing, enameling and decorating applications on a wide variety of glassware and chinaware. They can also be applied in a variety of printing methods.

More specifically, the glass frit compositions of this invention consist of

|  | Broad Range (weight %) | Preferred Range (weight %) |
|---|---|---|
| $SiO_2$ | 25–35 | 28–31 |
| $Bi_2O_3$ | 25–45 | 40–43 |
| $B_2O_3$ | 10–25 | 12–15 |
| Alkali metal oxide | 4–19 | 5.5–7.5 |
| $ZrO_2/TiO_2$ | 0.3–8 | 0.5–2 |

It is particularly to be noted that coatings which significantly exceed the 45 weight percent $Bi_2O_3$ concentration exhibit neither excellent color stability when blended with certain pigments in a glaze or enamel nor excellent resistance to scratching when exposed to detergent solutions.

Alkali metal oxides are $Na_2O$, $K_2O$ and $Li_2O$ with $Na_2O$ preferably being at least 50% by weight of the alkali metal oxide content. Individually, the $Na_2O$ may be present from 0–19.0 weight %, the $K_2O$ from 0–15.0 weight % and the $Li_2O$ from 0–3.0 weight %. When substituted for $Na_2O$, the $K_2O$ will tend to increase the firing temperature and thermal expansion, while the $Li_2O$ will lower the firing temperature but may create some thermal stresses. Additions of $ZrO_2$ and/or $TiO_2$ are beneficial, particularly in that the $ZrO_2$ will improve resistance to alkali and detergent solution attack, while the $TiO_2$ will improve resistance to acid attack. Individually, the $ZrO_2$ may be present from 0–3.0 weight % and the $TiO_2$ from 0–5.0 weight %.

In addition to the oxides listed above, the coatings may contain one or more of the following without adversely effecting the performance characteristics:

|  | weight percent |
|---|---|
| CaO | 0–4.0 |
| SrO | 0–15.0 |
| BaO | 0–19.0 |
| ZnO | 0–6.0 |
| $Al_2O_3$ | 0–4.0 |
| $WO_3$ | 0–1.0 |
| $Ce_2O_3$ | 0–1.5 |
| $NO_2$ | 0–10.0 |
| $Cr_2O_3$ | 0–7.0 |
| CoO | 0–15.0 |
| MnO | 0–8.0 |
| $P_2O_5$ | 0–10.0 |

The CaO, SrO and BaO can be added to increase firing temperature and lower thermal expansion, while improving resistance to chemical attack. The $Cr_2O_3$, CoO and MnO will provide color to the resulting glass. Other coloring agents known to those skilled in the art may also be included.

The glass frits can be prepared by mixing together the oxide producing materials, such materials being well known to those skilled in the art, charging the raw material mix into a glass melting furnace at temperatures of 1000°–1300° C. to produce the fused glass and then fritting the glass as by pouring into water or passing through water-cooled rolls. If required, the frit can be ground into powder by conventional grinding techniques. The resulting products generally have softening points in the range of 500° to 650° C. and coefficients of thermal expansion in the range of 70 to $90 \times 10^{-7}$ per °C.

The frits of the present invention are particularly useful for vitrifiable glass decorating colors, but they may also be used in related applications such as coatings on ceramic substrates. For example, to use these materials as a glass decorating color, a paste made up of the ground, dry powdered frit of the present invention, titanium dioxide pigment and a pine oil-based screen printing vehicle is prepared. This paste is then applied to the exterior of a glass jar or a glass sheet (e.g. by screen printing) and the coated surface is fired at 620° C. for ten minutes and slowly cooled. The result is a smooth, white vitreous coating which will resist attack from a variety of acidic and detergent or alkaline materials and will resist discoloration due to chemical reduction. It is also to be noted that other colorants and pigments can be dissolved and/or suspended in the frits to yield different colored glazes and enamels.

The following examples further illustrate the embodiments of this invention. In these examples, known starting materials and known techniques are utilized to prepare the appropriate raw batch glass compositions, to melt them at generally about 1175°–1260° C. (as indicated) for about 40 minutes and then to frit the compositions. The example compositions are fritted and ground to a finely divided state using a ball mill. The powders so prepared are formed into a paste by dispersing with a pine oil based vehicle.

For testing purposes, the pastes are screen printed upon microscope slides which are then dried and fired to determine the temperature at which a smooth continuous surface coating is achieved.

More specifically, to determine the expected commercial firing temperature, each example is fired in two laboratory ovens using a standard procedure consisting of preheating at 426° C. for 10 minutes to volatilize the pine oil based medium, followed immediately by transferring the slide to an oven at the test firing temperature. There it is heated for 15 minutes and then removed for evaluation. As an example, if after preheating, a particular specimen is fired at a test temperature of 605° C. for 15 minutes and not found to be smooth and continuous in its surface appearance, another higher test temperature is chosen. This test method has been found to be useful in determining the temperature at which a commercial furnace would be expected to give a mature, smooth continuous glass enamel surface when articles of commerce are coated or decorated and fired.

In another test utilized to evaluate the performance of the example specimens, microscope slides are screen printed and fired at the firing temperature found to yield a "mature" or smooth continuous surface and then annealed by slowly cooling. Thermal expansion stresses (TES) are measured using procedures outlined in ASTM C-978-87. The stress values reported indicate the thermal stress imparted to the microscope slide from the frit coating. For example, a negative value indicates that the microscope slide just beneath the frit coating is in a state of compression. A positive value indicates that the glass beneath the frit coating is in a state of tension. Values of stress which are negative should be less than 500 PSI in magnitude, or such coatings could impart harmful weakening if applied to soda lime silica glass articles. For example, a negative value of −150 is preferred over a negative value of −650 in this test. A positive value is in general less likely to cause harmful weakening of a glass article. It is very important to recognize that this test compares the relative stresses created on a particular substrate. In this case, if a value of −100 PSI is observed on a microscope test slide, the same coating applied to a soda lime silica glass jar or sheet would be expected to be close to 0 PSI. A value of −300 PSI in a microscope slide might be expected to yield a value of −200 PSI on soda lime silica sheet glass.

In another test used to evaluate performance of an example composition, a microscope slide coated with the test frit and fired to maturity is exposed to citric acid as described in ASTM C-724 using a rating system indicated below, which describes the appearance of the stain left by the citric acid.

1—No visible stain
2—Iridescent stain
3—Loss of surface gloss
4—Dull or matte surface with possible chalking
5—Significant removal of enamel with pinholing evident
6—Complete removal of the enamel Another procedure used to evaluate the performance of test examples is an evaluation of resistance to a concentrated commercial dishwasher detergent solution at 95° C. for 24 hours where the rating scale indicated above is used to determine performance.

Typical frit formulations of this invention and their attendant performance characteristics are noted in the following table.

| | weight percent | | | | | | | | | | | | | | | |
|---|---|---|---|---|---|---|---|---|---|---|---|---|---|---|---|---|
| SiO$_2$ | 30.60 | 29.78 | 31.97 | 29.87 | 28.13 | 30.32 | 29.78 | 29.98 | 27.46 | 33.93 | 27.37 | 28.88 | 26.06 | 28.56 | 28.09 | 29.70 | 29.98 |
| Bi$_2$O$_3$ | 41.88 | 41.02 | 37.50 | 35.03 | 38.62 | 41.76 | 41.02 | 35.16 | 37.58 | 33.47 | 37.46 | 40.43 | 35.67 | 39.34 | 38.70 | 40.90 | 29.30 |
| B$_2$O$_3$ | 13.72 | 13.44 | 12.98 | 18.70 | 17.67 | 15.74 | 15.47 | 15.47 | 17.19 | 17.86 | 16.44 | 15.24 | 19.84 | 18.94 | 20.81 | 15.42 | 19.52 |
| Na$_2$O | 6.35 | 6.22 | 7.60 | 7.10 | 6.71 | 5.51 | 7.13 | 7.13 | 6.53 | 6.78 | 6.81 | 7.02 | 7.77 | 6.83 | 5.11 | 7.11 | 8.93 |
| ZnO | 2.99 | 2.93 | 3.13 | 2.92 | 2.76 | 2.98 | — | 5.86 | 5.37 | 2.79 | 2.68 | 2.89 | 5.10 | — | 2.76 | 2.92 | 5.86 |
| ZrO$_2$ | 1.42 | 0.98 | 1.47 | 1.37 | 1.11 | 1.00 | 0.98 | 1.38 | 1.26 | 0.94 | 1.26 | — | 1.20 | 0.94 | 0.93 | 0.98 | 1.38 |
| TiO$_2$ | — | 2.64 | 2.19 | 2.04 | 2.21 | 2.68 | 2.64 | 2.05 | 1.88 | 1.39 | 1.87 | 2.60 | 1.78 | 2.53 | 2.49 | — | 2.05 |
| NO$_2$ | 3.04 | 2.98 | 3.18 | 2.97 | 2.80 | — | 2.98 | 2.98 | 2.73 | 2.83 | 6.12 | 2.93 | 2.59 | 2.85 | — | — | 2.98 |
| Ce$_2$O$_3$ | — | — | — | — | — | — | — | — | — | — | — | — | — | — | 1.11 | 2.97 | — |
| Melting Temp. (°C) | 1205 | 1205 | 1260 | 1205 | 1205 | 1175 | 1175 | 1260 | 1205 | 1205 | 1205 | 1175 | 1205 | 1205 | 1205 | 1175 | 1260 |
| Firing Temp. (°C) | 605 | 605 | 615 | 610 | 595 | 605 | 620 | 610 | 605 | 620 | 613 | 615 | 600 | 600 | 650 | 615 | 605 |
| TES (psi) | −282 | −176 | −180 | −95 | −142 | −201 | −181 | −280 | −96 | 0 | −168 | −182 | −263 | −105 | +183 | −176 | −391 |
| Citric acid | 2 | 2 | 2 | 2 | 2 | 2+ | 1 | 2 | 2-3 | 2 | 3+ | 1 | 3-4 | 1 | — | 2 | 4 |
| Detergent | 2 | 2 | 2-3 | — | — | — | 6 | 3 | 2.3 | — | — | — | 2-3 | — | — | 2 | 4 |
| Appearance | s.f. | cl. | — | — | cl. | cl. | f. | — | — | — | — | cl. | — | s.f. | — | cl. | — | s.f. = slight fog
f. = fog
cl. = clear

These results thus indicate the performance benefits of the instant systems.

Summarizing, this invention is seen to provide lead-free glass frit compositions exhibiting improved performance characteristics. Variations may be made in procedures, proportions and materials without departing from the scope of the invention as defined by the following claims.

What is claimed is:

1. A lead-free glass frit composition consisting essentially of the following components in the indicated weight percent amounts:
   $SiO_2$: 25–35
   $Bi_2O_3$: 25–43
   $B_2O_3$: 12–25
   alkali metal oxide: 4–19
   $ZrO_2$: 0–3
   $TiO_2$: 0–5
   $ZnO$: 0–6
   $CaO$: 0–4
   $SrO$: 0–15
   $BaO$: 0–19
   $Al_2O_3$: 0–4
   $NO_2$: 0–10
   $WO_3$: 0–1
   $Ce_2O_3$: 0–1.5
   $Cr_2O_3$: 0–7
   $CoO$: 0–15
   $MnO$: 0–8
   $P_2O_5$: 0–10 with the amount of $ZrO_2 + TiO_2$ being 0.3–8.

2. The composition of claim 1 wherein the indicated components are present in the indicated weight percent amounts:
   $SiO_2$: 28–31
   $Bi_2O_3$: 40–43
   $B_2O_3$: 12–15
   alkali metal oxide: 5.5–7.5
   $ZrO_2 + TiO_2$: 0.5–2

3. The composition of claim 1, wherein the alkali metal oxide is selected from the group consisting of sodium, potassium and lithium oxides and the individual components when present in the composition are present in a maximum concentration of 3.0 weight % $Li_2O$, 15.0 weight % $K_2O$ and 19.0 weight % $Na_2O$.

4. The composition of claim 1, wherein $Na_2O$ is at least 50%, by weight, of the alkali metal oxide concentration.

5. The composition of claim 1, wherein both $ZrO_2$ and $TiO_2$ are present.

6. The composition of claim 1 consisting essentially of the following components in the indicated weight percent amounts:
   $SiO_2$: 30.60
   $Bi_2O_3$: 41.88
   $B_2O_3$: 13.72
   $Na_2O$: 6.35
   $ZnO$: 2.99
   $ZrO_2$: 1.42
   $NO_2$: 3.04

* * * * *